US006869982B2

(12) United States Patent
Dang et al.

(10) Patent No.: US 6,869,982 B2
(45) Date of Patent: Mar. 22, 2005

(54) IRRADIATED, OXIDIZED OLEFIN POLYMER COUPLING AGENTS

(75) Inventors: Vu A. Dang, Bear, DE (US); Richard J. Fezza, Wilmington, DE (US); Daniel E. Schneckenburger, Chesapeake City, MD (US); Cheng Q. Song, Wilimington, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 55 days.

(21) Appl. No.: 10/305,872

(22) Filed: Nov. 27, 2002

(65) Prior Publication Data

US 2004/0102550 A1 May 27, 2004

(51) Int. Cl.$^7$ .................................................. C08F 2/46
(52) U.S. Cl. ..................... 522/112; 522/111; 522/150; 522/157; 522/158; 522/161; 522/71; 522/74; 522/81; 522/83; 525/88; 525/89; 525/191; 525/240
(58) Field of Search ........................... 525/191, 88, 89, 525/240; 522/112, 161, 158, 157, 150, 111, 71, 74, 81, 83

(56) References Cited

U.S. PATENT DOCUMENTS

| 3,414,551 A | 12/1968 | Reid et al. ................. 260/88.2 |
| 4,382,007 A | 5/1983 | Chafetz et al. ......... 252/51.5 A |
| 4,797,438 A | 1/1989 | Kletecka et al. ............. 524/100 |
| 4,931,230 A | 6/1990 | Krueger et al. ................ 264/6 |
| 4,960,820 A | 10/1990 | Hwo ......................... 524/528 |
| 5,047,446 A | 9/1991 | DeNicola, Jr. .............. 522/157 |
| 5,078,925 A | 1/1992 | Rolando et al. ............... 264/6 |
| 5,079,283 A | * 1/1992 | Burditt et al. ................. 524/94 |
| 5,122,593 A | 6/1992 | Jennings et al. ............ 524/100 |
| 5,155,197 A | 10/1992 | Austin et al. ............... 526/336 |
| 5,254,378 A | 10/1993 | Krueger et al. ............ 428/34.1 |
| 5,272,195 A | 12/1993 | Hagenson et al. .......... 524/188 |
| 5,324,755 A | 6/1994 | Kilius et al. ................ 523/214 |
| 5,508,318 A | * 4/1996 | Comer ....................... 522/112 |
| 5,554,668 A | 9/1996 | Scheve et al. .............. 522/157 |
| 5,591,785 A | 1/1997 | Scheve et al. .............. 522/157 |
| 5,643,989 A | 7/1997 | Van De Grampel et al. ............ 524/494 |
| 5,705,568 A | 1/1998 | Gahleitner et al. ......... 525/194 |
| 5,731,363 A | 3/1998 | Okamoto et al. ............. 522/16 |
| 5,804,304 A | 9/1998 | Williams et al. ............ 428/364 |
| 5,817,707 A | 10/1998 | DeNicola, Jr. et al. ..... 522/157 |
| 5,820,981 A | 10/1998 | Williams et al. ............ 428/364 |
| 5,883,151 A | 3/1999 | Raetzsch et al. ............ 222/157 |
| 6,103,833 A | 8/2000 | Hogt et al. .................. 525/386 |
| 6,337,373 B1 | 1/2002 | Formaro et al. ............ 525/193 |
| 6,444,722 B1 | 9/2002 | Dang et al. ................. 522/157 |

FOREIGN PATENT DOCUMENTS

| DE | 1570353 | 5/1965 | ............. C08F/3/12 |
| EP | 0351866 | 1/1990 | ............. C08F/6/02 |
| EP | 0634454 | 1/1995 | ........... C08L/23/10 |

OTHER PUBLICATIONS

S. Siggia et al., "Organic Peroxides;" *Quantitive Organic Analysis via Functional Groups;* 4$^{th}$ Edition, Wiley, NY; Chapter 6, pp. 325–372 (1979).

U.S. Appl. No. 10/305,816, filed Nov. 27, 2002; "Compatibilizing Agent for Engineering Thermoplastic/Polyolefin Blend"—EL 6067 (US).

U.S. Appl. No. 10/305,844, filed Nov. 27, 2002; "Irradiated, Oxidized Polymer Dispersing Agents"—EL 6068 (US).

D. Lu et al., *Structure and mechanical properties of isotactic polypropylene and iPP/talc blends functionalized by electron beam irradiation*; Polymer Int.; vol. 49 (1389–1394) 2000.

R. Guan, *Structure and Morphology of Isotactic Polyprepylene Functionalized by Electron Beam Irradiation*; Journal of Applied Polymer Science; vol. 76 (75–82) 2000.

* cited by examiner

*Primary Examiner*—James J. Seidleck
*Assistant Examiner*—Sanza L. McClendon

(57) ABSTRACT

Irradiated, oxidized olefin polymer coupling agents for use in the manufacture of non-halogenated flame retardant-containing and filler-containing olefin polymer compositions and coupling agent-containing olefin polymer concentrates.

16 Claims, No Drawings

IRRADIATED, OXIDIZED OLEFIN POLYMER COUPLING AGENTS

FIELD OF THE INVENTION

The present invention relates to irradiated, oxidized olefin polymer coupling agents for use in the manufacture of non-halogenated flame retardant or filler-containing olefin polymer compositions, and the resulting coupling agent-containing olefin polymer concentrates.

BACKGROUND

It is well known to use non-halogenated flame retardants or fillers to augment the mechanical properties of olefin polymer compositions. Polyolefins filled with organic and inorganic materials have shown high performance, recyclability, and flexibility in design and fabrication. There is a need, however, to couple the polar non-halogenated flame retardants and fillers with the non-polar olefin composition in such applications, to increase the interfacial adhesion between the non-halogenated flame retardant or filler and polymer matrix, since poor interfacial adhesion often results in poor mechanical properties of the polymer blends. U.S. Pat. No. 5,324,755 discloses the use of olefin polymers chemically modified with ethylenically unsaturated carboxylic acids or derivatives thereof, such as acrylic acid, maleic acid, itaconic acid, maleic anhydride, citraconic anhydride and itaconic anhydride, as coupling agents. U.S. Pat. No. 3,414,551 discloses modifying propylene polymers with maleic anhydride, which can be used as adhesives. However, conventional coupling agents for non-halogenated flame retardant-containing and filled polyolefins do not significantly modify the rheological properties of the polymer blends in the polymer matrix. As a result, the potential polymer-processing window is narrowed due to its flow characteristics. In addition, conventional coupling agents do not typically improve the dispersion of non-halogenated flame retardants or fillers and if they make any improvement at all, it is minimal. Improving such dispersion would be desirable since it enhances the uniformity of mechanical properties throughout the polymer material, as well as increasing the effectiveness of commonly used additives, such as colorants and flame retardants that also can be present in the polymer composition. Thus, there continues to be a need for coupling agents in non-halogentated flame retardant or filler-containing olefin polymer compositions that can modify the rheological properties of the polymer matrix, and which may also function as a dispersant for additives.

It has unexpectedly been found that the irradiated, oxidized olefin polymer coupling agents of the present invention provide distinct advantages in the coupling of non-halogenated flame retardants, fillers or mixtures thereof in the olefin polymer matrix; providing an improved balance of physical properties to compositions containing such an olefin polymer matrix, while also improving the dispersion of the non-halogenated flame retardants, fillers or mixtures thereof.

SUMMARY OF THE INVENTION

In one embodiment, the present invention relates to a non-halogenated flame retardant-containing or filler-containing olefin polymer composition comprising:

A. 2.0 to 60.0 wt % of an irradiated, oxidized, olefin polymer material;

B. 10.0 to 85.0 wt % of (i) a non-halogenated flame retardant, (ii) a filler selected from the group consisting of fiberglass, carbon fibers, graphite fibers, whiskers, metal fibers, aramides, talc, wollastonite, calcium carbonate, mica, glass microspheres, glass wool, rock wool, stainless steel wool, steel wool, gypsum, alumina, alumina-silica, and silica, or (iii) mixtures thereof; and C. 1.0 to 88.0 wt % of a non-irradiated, non-oxidized olefin polymer material;

wherein the sum of components A+B+C is equal to 100 wt %.

In another embodiment, the present invention relates to an olefin polymer concentrate containing a coupling agent comprising:

A. 90.0 to 15.0 wt % of an irradiated, oxidized olefin polymer material; and

B. 10.0 to 85.0 wt % of (i) a non-halogenated flame retardant, (ii) a filler selected from the group consisting of fiberglass, carbon fibers, graphite fibers, whiskers, metal fibers, aramides, talc, wollastonite, calcium carbonate, mica, glass microspheres, glass wool, rock wool, stainless steel wool, steel wool, gypsum, alumina, alumina-silica, and silica, and (iii) mixtures thereof;

wherein the sum of components A+B is equal to 100 wt %.

DETAILED DESCRIPTION OF THE INVENTION

Suitable olefin polymers useful as the irradiated and oxidized or non-irradiated and non-oxidized olefin polymers are propylene polymer materials, ethylene polymer materials, butene-1 polymer materials, and mixtures thereof.

When a propylene polymer material is used as the non-irradiated and non-oxidized olefin polymer material or as the starting material for making the irradiated, oxidized olefin polymer of the present invention, the propylene polymer material can be:

(A) a crystalline homopolymer of propylene having an isotactic index greater than 80%, preferably about 90% to about 99.5%;

(B) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 60%, preferably at least 70%;

(C) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and when ethylene is one of the olefins, the maximum polymerized ethylene content is 5% by weight, preferably about 4%, the terpolymer having an isotactic index greater than 85%;

(D) an olefin polymer composition comprising:
(i) about 10 parts to about 60 parts by weight, preferably about 15 parts to about 55 parts, of a crystalline propylene homopolymer having an isotactic index at least 80%, preferably about 90 to about 99.5%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, preferably about 90% to about 99%, and an isotactic index greater than 60%;

(ii) about 3 parts to about 25 parts by weight, preferably about 5 parts to about 20 parts, of a copolymer of ethylene and propylene or a $C_4$–$C_8$ α-olefin that is insoluble in xylene at ambient temperature; and (iii) about 10 parts to about 80 parts by weight, preferably about 15 parts to about 65 parts, of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight, preferably about 10% to about 60%, most preferably about 12% to about 55%, of ethylene and being soluble in xylene at ambient temperature and having an intrinsic viscosity of about 1.5 to about 4.0 dl/g; the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages;

(E) a thermoplastic olefin comprising:

(i) about 10% to about 60%, preferably about 20% to about 50%, of a propylene homopolymer having an isotactic index at least 80%, preferably 90–99.5% or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;

(ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a α-olefin, the copolymer optionally containing about 0.5% to about 10% of a diene, and containing less than 70% ethylene and being soluble in xylene at ambient temperature;

(iii) about 3% to about 40%, preferably about 10% to about 20%, of a copolymer of ethylene and propylene or an α-olefin that is insoluble in xylene at ambient temperature; and (F) mixtures thereof.

When an ethylene polymer material is used as the non-irradiated and non-oxidized olefin polymer material or as the starting material for making the irradiated, oxidized olefin polymer of the present invention, the ethylene polymer material is selected from the group consisting of (a) homopolymers of ethylene, (b) random copolymers of ethylene and an alpha-olefin selected from the group consisting of $C_{3-10}$ alpha-olefins having a maximum polymerized alpha-olefin content of about 20 wt %, preferably a maximum of about 16 wt %, by weight, (c) random terpolymers of ethylene and said alpha-olefins, provided that the maximum polymerized alpha-olefin content is about 20 wt %, preferably the maximum is about 16 wt %, by weight, and (d) mixtures thereof. The $C_{3-10}$ alpha-olefins include the linear and branched alpha-olefins such as, for example, propylene, 1-butene, isobutylene, 1-pentene, 3-methyl-1-butene, 1-hexene, 3,4-dimethyl-1-butene, 1-heptene, 3-methyl-1-hexene, 1-octene and the like.

When the ethylene polymer is an ethylene homopolymer, it typically has a density of 0.89 g/cm$^3$ or greater, and when the ethylene polymer is an ethylene copolymer with a $C_{3-10}$ alpha-olefin, it typically has a density of 0.91 g/cm$^3$ or greater but less than 0.94 g/cm$^3$. Suitable ethylene copolymers include ethylene/butene-1, ethylene/hexene-1, ethylene/octene-1 and ethylene/4-methyl-1-pentene. The ethylene copolymer can be a high density ethylene copolymer or a short chain branched linear low density ethylene copolymer (LLDPE), and the ethylene homopolymer can be a high density polyethylene (HDPE) or a low density polyethylene (LDPE). Typically the LLDPE and LDPE have densities of 0.910 g/cm$^3$ or greater to less than 0.940 g/cm$^3$ and the HDPE and high density ethylene copolymer have densities of greater than 0.940 g/cm$^3$, usually 0.95 g/cm$^3$ or greater. In general, ethylene polymer materials having a density from 0.89 to 0.97 g/cm$^3$ are suitable for use in the practice of this invention. Preferably the ethylene polymers are LLDPE and HDPE having a density from 0.89 to 0.97 g/cm$^3$.

When a butene-1 polymer material is used as the non-irradiated and non-oxidized olefin polymer material or as the starting material for making the irradiated, oxidized olefin polymer of the present invention, the butene-1 polymer material is selected from a normally solid, high molecular weight, predominantly crystalline butene-1 polymer material selected from the group consisting of:

(1) a homopolymer of butene-1;

(2) a copolymer or terpolymer of butene-1 with a non-butene alpha-olefin comonomer content of 1–15 mole %, preferably 1–10 mole %; and (3) mixtures thereof.

Typically the non-butene alpha-olefin comonomer is ethylene, propylene, a $C_{5-8}$ alpha-olefin or mixtures thereof.

The useful polybutene-1 homo or copolymers can be isotactic or syndiotactic and have a melt flow rate (MFR) from about 0.5 to 150, preferably from about 0.5 to 100, and most preferably from 0.5 to 75 g/10 min.

These poly-1-butene polymers, their methods of preparation, and their properties are known in the art. An exemplary reference containing additional information on polybutylene-1 is U.S. Pat. No. 4,960,820, the disclosures of which are incorporated herein by reference.

Suitable polybutene-1 polymers can be obtained, for example, by Ziegler-Natta low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10–100° C., preferably 20–40° C., e.g., according to the process described in DE-A-1,570,353. It can also be obtained, for example, by using $TiCl_4$—$MgCl_2$ catalysts. High melt indices are obtainable by further processing of the polymer by peroxide cracking or visbreaking, thermal treatment or irradiation to induce chain scissions leading to a higher MFR material.

Preferably, the polybutene-1 contains up to 15 mole % of copolymerized ethylene or propylene, but more preferably it is a homopolymer, for example, Polybutene PBO300 homopolymer marketed by Basell USA Inc. This polymer is a homopolymer with a melt flow of 11 g/10 min. at 230° C. and 2.16 kg and a weight average molecular weight of 270,000 dalton.

Preferably, the polybutene-1 homopolymer has a crystallinity of at least 55% by weight measured with wide-angle X-ray diffraction after 7 days. Typically the crystallinity is less than 70%, preferably less than 60%.

The non-irradiated, non-oxidized olefin polymer material and the starting material for the irradiated and oxidized olefin polymer material can be the same or different from each other.

The olefin polymer starting material for the irradiated, oxidized olefin polymer is exposed to high-energy ionizing radiation under a blanket of inert gas, preferably nitrogen. The ionizing radiation should have sufficient energy to penetrate the mass of polymer material being irradiated to the extent desired. The ionizing radiation can be of any kind, but preferably includes electrons and gamma rays. More preferred are electrons beamed from an electron generator having an accelerating potential of 500–4,000 kilovolts. Satisfactory results are obtained at a dose of ionizing radiation of about 0.1 to about 15 megarads ("Mrad"), preferably about 0.5 to about 9.0 Mrad.

The term "rad" is usually defined as that quantity of ionizing radiation that results in the absorption of 100 ergs of energy per gram of irradiated material regardless of the source of the radiation using the process described in U.S. Pat. No. 5,047,446. Energy absorption from ionizing radiation is measured by the well-known convention dosimeter, a measuring device in which a strip of polymer film containing a radiation-sensitive dye is the energy absorption sensing means. Therefore, as used in this specification, the term "rad" means that quantity of ionizing radiation resulting in the absorption of the equivalent of 100 ergs of energy per gram of the polymer film of a dosimeter placed at the surface of the olefin material being irradiated, whether in the form of a bed or layer of particles, or a film, or a sheet.

The irradiated olefin polymer material is then oxidized in a series of steps. The first treatment step consists of heating the irradiated polymer in the presence of a first controlled amount of active oxygen greater than 0.004% by volume but less than 15% by volume, preferably less than 8% by volume, more preferably less than 5% by volume, and most preferably from 1.3% to 3.0% by volume, to a first temperature of at least 25° C. but below the softening point of the polymer, preferably about 25° C. to 140° C., more preferably about 25° C. to 100° C., and most preferably about 40° C. to 80° C. Heating to the desired temperature is accomplished as quickly as possible, preferably in less than 10 minutes. The polymer is then held at the selected temperature, typically for about 5 to 90 minutes, to increase the extent of reaction of the oxygen with the free radicals in the polymer. The holding time, which can be determined by one skilled in the art, depends upon the properties of the starting material, the active oxygen concentration used, the irradiation dose, and the temperature. The maximum time is determined by the physical constraints of the fluid bed.

In the second treatment step, the irradiated polymer is heated in the presence of a second controlled amount of oxygen greater than 0.004% but less than 15% by volume, preferably less than 8% by volume, more preferably less than 5% by volume, and most preferably from 1.3% to 3.0% by volume, to a second temperature of at least 25° C. but below the softening point of the polymer. Preferably, the second temperature is from 100° C. to less than the softening point of the polymer, and greater than the first temperature of the first step. The polymer is then held at the selected temperature and oxygen concentration conditions, typically for about 90 minutes, to increase the rate of chain scission and to minimize the recombination of chain fragments so as to form long chain branches, i.e., to minimize the formation of long chain branches. The holding time is determined by the same factors discussed in relation to the first treatment step.

In the optional third step, the oxidized olefin polymer material is heated under a blanket of inert gas, preferably nitrogen, to a third temperature of at least 80° C. but below the softening point of the polymer, and held at that temperature for about 10 to about 120 minutes, preferably about 60 minutes. A more stable product is produced if this step is carried out. It is preferred to use this step if the irradiated, oxidized olefin polymer material is going to be stored rather than used immediately, or if the radiation dose that is used is on the high end of the range described above. The polymer is then cooled to a fourth temperature of about 70° C. over a period of about 10 minutes under a blanket of inert gas, preferably nitrogen, before being discharged from the bed. In this manner, stable intermediates are formed that can be stored at room temperature for long periods of time without further degradation.

The preferred method of carrying out the treatment is to pass the irradiated polymer through a fluid bed assembly operating at a first temperature in the presence of a first controlled amount oxygen, passing the polymer through a second fluid bed assembly operating at a second temperature in the presence of a second controlled amount of oxygen, and then maintaining the polymer at a third temperature under a blanket of nitrogen, in a third fluid bed assembly. In commercial operation, a continuous process using separate fluid beds for the first two steps, and a purged, mixed bed for the third step is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent re-solidification and comminution into the desired form. The fluidizing medium can be, for example, nitrogen or any other gas that is inert with respect to the free radicals present, e.g., argon, krypton, and helium.

As used in this specification, the expression "room temperature" or "ambient" temperature means approximately 25° C. The expression "active oxygen" means oxygen in a form that will react with the irradiated olefin polymer material. It includes molecular oxygen, which is the form of oxygen normally found in air. The active oxygen content requirement of this invention can be achieved by replacing part or all of the air in the environment by an inert gas such as, for example, nitrogen.

The concentration of peroxide groups formed on the polymer can be controlled easily by varying the radiation dose during the preparation of the irradiated polymer and the amount of oxygen to which such polymer is exposed after irradiation. The oxygen level in the fluid bed gas stream is controlled by the addition of dried, filtered air at the inlet to the fluid bed. Air must be constantly added to compensate for the oxygen consumed by the formation of peroxides in the polymer.

The irradiated, oxidized olefin polymer material of the invention contains peroxide linkages that degrade during compounding to form various oxygen-containing polar functional groups, e.g., acids, ketones and esters. In addition, the number average and weight average molecular weight of the irradiated, oxidized olefin polymer is usually much lower than that of the corresponding olefin polymer used to prepare same, due to the chain scission reactions during irradiation and oxidation.

Preferably, the non-irradiated and non-oxidized olefin polymer and the starting material for making the irradiated, oxidized olefin polymer material is a propylene polymer material, more preferably a propylene homopolymer having an isotactic index greater than 80%.

Suitable fillers include reinforcing fibers such as fiberglass, carbon fibers, graphite fibers, metal fibers, whiskers and aramides; inert fillers such as talc, wollastonite, mica, calcium carbonate, glass microspheres, glass wool, rock wool, stainless steel wool, steel wool, and gypsum; ceramic fibers such as alumina, alumina silica and silica; and mixtures thereof. The inert fillers of the invention are preferably present as finely divided solids with a particle size range of from 0.8 to 40 microns.

In the non-halogenated flame retardant-containing or filler-containing olefin polymer compositions, the non-halogenated flame retardant or fillers can be present in an amount from 10.0 to 85.0 wt %, preferably 25.0 to 80.0 wt %, more preferably 30 to 70 wt %. The irradiated, oxidized olefin polymer material can be present in an amount from 2.0 to 60.0 wt %, preferably 2 to 20 wt %, more preferably 2 to 10 wt %. The balance of the composition up to 100 wt % is the non-irradiated, non-oxidized olefin polymer material.

When a non-halogenated flame retardant is present, its primary function is as a flame retardant, but when present in amounts of 10 wt % or more it also functions as a filler. Typically the particle size is less than three microns. Typical examples include quaternary phosphonium compounds, magnesium hydroxide, and aluminum hydroxide or its hydrates. The non-halogenated flame retardant is preferably present in an amount from 10 to 85 wt %, more preferably 25 to 80 wt %, most preferably 30 to 70 wt %. The irradiated, oxidized olefin polymer material is preferably present in an amount from 2 to 60 wt %, more preferably in an amount from 2 to 20 wt %, most preferably 2 to 10 wt %. The balance of the composition is the non-irradiated, non-oxidized olefin polymer material.

When the filler is a reinforcing fiber, such as fiberglass or glass fibers, suitable materials include those commercially available glass fibers, carbon fibers, graphite fibers, metal fibers, whiskers and aramides typically marketed or promoted as reinforcing agents. The concentration of reinforcing fiber is preferably from about 10 to 50 wt %, more preferably 10 to 40 wt %, and most preferably 20 to 30 wt %. The irradiated, oxidized olefin polymer material is preferably present in an amount from 2 to 60 wt %, more preferably in an amount from 2 to 20 wt %, most preferably 2 to 10 wt %. The balance of the composition is the non-irradiated, non-oxidized olefin polymer material.

When the filler is an inert filler, such as talc and wollastonite, the concentration of the inert filler is preferably from about 10 to 50 wt %, more preferably 10 to 40 wt %, and most preferably 20 to 30 wt %. The irradiated, oxidized olefin polymer material is preferably present in an amount from 2 to 60 wt %, more preferably 2 to 20 wt %, most preferably from 2 to 10 wt %. The balance of the composition is the non-irradiated, non-oxidized olefin polymer material.

The compositions of the invention can also contain additives such as halogenated flame retardants, anti-microbial agents, anti-acids, conductive carbon black, and colorants typically used with polyolefins such as carbon black, titanium oxide, graphite or color index (C.I.) pigment yellow series 62, 139, 151, 155, 169, 180, 181, 191, 194; C.I. pigment red series 122, 144, 149, 170, 175, 176, 185, 187, 209, 214, 242, 247, 262, 48:2, 48:3, 53:1, 57:1; C.I. pigment orange series 38, 43, 68, 72; C.I. pigment violet series 19, 23; C.I. pigment blue series 15:1, 15:3, 15:4; C.I. pigment brown series 25 and 41, C.I. pigment green series 7, and phthalocyanine blue; and mixtures thereof. When present, such additives are preferably present in an amount from 0.1 to 5.0 wt %, more preferably from 0.5 to 1.5 wt %.

The non-irradiated, non-oxidized olefin polymer material; non-halogenated flame retardants, fillers or mixtures thereof, optionally, additives; and an irradiated, oxidized olefin polymer material can be combined at ambient temperature in conventional operations well known in the art; including, for example, drum tumbling, or with low or high speed mixers. The resulting composition is then compounded in the molten state in any conventional manner well known in the art, in batch or continuous mode; for example, by using a Banbury mixer, a kneading machine, or a single or twin screw extruder. The material can then be pelletized.

In the coupling agent-containing olefin polymer concentrate, the filler or non-halogenated flame retardant can be present in an amount from 10 to 85 wt %, preferably 20 to 75 wt %, more preferably 30 to 60 wt %. The balance of the composition is the irradiated, oxidized olefin polymer material.

When producing a coupling agent-containing olefin polymer concentrate where the filler is a reinforcing fiber, the reinforcing fiber is preferably present in an amount from 10 to 70 wt %, more preferably 20 to 65 wt %, most preferably 30 to 60 wt %. The balance of the composition is the irradiated, oxidized olefin polymer material. Suitable types of reinforcing fibers are as described above.

When producing a coupling agent-containing olefin polymer concentrate containing a non-halogenated flame retardant, the non-halogenated flame retardant is preferably present in an amount from 10 to 85 wt %, more preferably 20 to 75 wt %, most preferably 30 to 60 wt %. The balance of the composition is the irradiated, oxidized olefin polymer material. Suitable types of non-halogenated flame retardants are as described above.

When producing a coupling agent-containing olefin polymer concentrate where the filler is an inert filler, the inert filler is preferably present in an amount from 10 to 70 wt %, more preferably 20 to 65 wt %, most preferably 30 to 60 wt %. The balance of the composition is the irradiated, oxidized olefin polymer material. Suitable types of inert fillers are as described above.

The irradiated, oxidized olefin polymer material, non-halogenated flame retardant, and fillers can be combined and compounded in the manner as described above.

Unless otherwise specified, the properties of the olefin polymer materials, compositions and concentrates that are set forth in the following examples have been determined according to the test methods set forth in Table I below.

TABLE I

| | |
|---|---|
| Melt Flow Rate | ASTM D1238, units of dg/min |
| ("MFR") | Propylene polymer material: (230 C; 2.16 kg) |
| | Ethylene polymer material: (190 C; 2.16 kg) |
| | Butene-1 polymer material: (230 C; 2.16 kg) |
| Colorant dispersion testing | ASTM E1347 |
| Isotactic Index, | Defined as the percent of olefin polymer insoluble in xylene. The weight percent |

TABLE I-continued

| | |
|---|---|
| ("I.I.") | of olefin polymer soluble in xylene at room temperature is determined by dissolving 2.5 g of polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. These values correspond substantially to the isotactic index determined by extracting with boiling n-heptane, which by definition constitutes the isotactic index of polypropylene. |
| Tensile @ yield | ASTM D638-89 |
| Tensile @ break | ASTM D638-89 |
| Tensile Young's Modulus | ASTM D638-89 |
| Flex Modulus @ 1% secant | ASTM D790-92 |
| Flex strength | ASTM D790-92 |
| Peroxide Concentration | Quantitative Organic Analysis via Functional Groups, by S. Siggia et al., 4th Ed., NY, Wiley 1979, pp. 334–42. |
| Heat Deflection Temperature, ("HDT") | ASTM D648-01B |

Unless otherwise specified, all references to parts, percentages and ratios in this specification refer to percentages by weight.

EXAMPLE 1

This example illustrates a general procedure for preparing an irradiated, oxidized propylene polymer. A polypropylene homopolymer having an MFR of 0.7 dg/min and I.I. of 95.6% commercially available from Basell USA Inc. was irradiated at 0.5 Mrad under a blanket of nitrogen. The irradiated polymer was then treated with 2.5% by volume of oxygen at 55° C. for 60 minutes and then with 2.5% by volume of oxygen at 140° C. for an additional 60 minutes. The oxygen was then removed. The polymer was then heated at 140° C. under a blanket of nitrogen for 90 minutes, cooled and collected. The MFR of the resultant polymer material was 1300 dg/min. The peroxide concentration was 28 mmol/kg of polymer.

EXAMPLE 2

An irradiated, oxidized propylene polymer was prepared from a polypropylene homopolymer, commercially available from Basell USA Inc., having an MFR of 0.32 and isotactic index of 95.6% according to the procedure of Example 1, except that the polypropylene homopolymer was irradiated at 1.0 Mrad, and the irradiated polymer was treated with 1.8% by volume of oxygen at 23° C. for 60 minutes and then with 1.8% by volume of oxygen at 140° C. for another 60 minutes. The MFR of the resulting polymer material was 343 dg/min.

EXAMPLE 3

An irradiated, oxidized propylene polymer was prepared from a polypropylene heterophasic or impact-modified polymer, commercially available from Basell USA Inc., having an MFR of 0.24 and isotactic index of 86.0%, containing polypropylene homopolymer matrix and 14 wt % of a $C_2/C_3$ rubber fraction dispersed therein, and having an ethylene content of 62.0 wt %. The procedure was according to Example 1, except that the copolymer was irradiated at 1.0 Mrad. The irradiated polymer was then treated with 5.0% by volume of oxygen at 23° C. for 60 minutes and then with 5.0% by volume of oxygen at 120° C. for 120 minutes. The polymer was maintained at 120° C. under a blanket of nitrogen for 90 minutes. The MFR of the resulting polymer material was 15.1 dg/min.

EXAMPLE 4

An irradiated, oxidized propylene polymer was prepared from a propylene-ethylene random copolymer, commercially available from Basell USA Inc., having an MFR of 2.0 and isotactic index of 94.0%, containing 1.25 wt % ethylene, according to the procedure of Example 3, except that the irradiated polymer was treated with 2.0% by volume of oxygen at 23° C. for 60 minutes and then with 2.0% by volume of oxygen at 120° C. for another 120 minutes. The polymer was maintained at 120° C. under a blanket of nitrogen for 60 minutes. The MFR of the resulting material was 518 dg/min.

EXAMPLE 5

An irradiated, oxidized propylene polymer was prepared from a polypropylene homopolymer, commercially available from Basell USA Inc., having an MFR of 0.7 and I.I. of 95.6% according to the procedure of Example 1, except that the propylene homopolymer was irradiated at 1.0 Mrad, and the irradiated polymer was treated at 1.8% by volume of oxygen at 23° C. for 60 minutes and then with 1.8% by volume of oxygen at 140° C. for another 60 minutes. The polymer was then heated at 140° C. while under a blanket of nitrogen for 60 minutes. The MFR of the resulting material was 343 dg/min. The peroxide concentration was 25 mmole/kg of polymer.

EXAMPLE 6

An irradiated, oxidized propylene polymer was prepared from a polypropylene homopolymer, commercially available from Basell USA Inc., having an MFR of 0.48 and I.I. index of 95.4%, according to the procedure of Example 1, except that the irradiated polymer was treated with 1.35% by volume of oxygen at 80° C. for 5 minutes and then with 1.30% by volume of oxygen at 140° C. for another 60 min. The MFR of the resulting polymer material was 18 dg/min. The peroxide concentration was 8.2 mmole/kg of polymer.

EXAMPLE 7

An irradiated, oxidized propylene polymer was prepared from a polypropylene homopolymer, commercially available from Basell USA Inc., having an MFR of 12.5 and isotactic index of 95.0% according to the procedure of Example 1, except that the irradiated polymer was treated with 2.0% by volume of oxygen at 80° C. for 5 minutes and then with 3.0% by volume of oxygen at 120° C. for another 60 minutes. The MFR of the resulting polymer material was 411 dg/min. The peroxide concentration was 25.0 mmole/kg of polymer.

EXAMPLE 8

An irradiated, oxidized propylene polymer was prepared from a polypropylene homopolymer, commercially available from Basell USA Inc., having an MFR of 0.48 and isotactic index of 95.4% according to the procedure of Example 1, except that the irradiated polymer was treated with 2.0% by volume of oxygen at 80° C. for 5 minutes and then with 3.0% by volume of oxygen at 140° C. for another 60 minutes. The MFR of the resulting polymer material was 115 dg/min. The peroxide concentration was 23.3 mmole/kg of polymer

EXAMPLE 9

An irradiated, oxidized ethylene polymer was prepared from a random copolymer of ethylene and butene, with a butene content of 9%, having an MFR of 2.1 dg/min and density of 0.916 g/cm³ commercially available from Haladia Petrochemicals LTD. The copolymer was irradiated at 1.0 Mrad under a blanket of nitrogen. The irradiated polymer was then treated with 5.0% by volume of oxygen at ambient temperature for 60 minutes and then with 5.0% by volume of oxygen at 110° C. for an additional 60 minutes. The oxygen was then removed. The polymer was then heated at 110° C. under a blanket of nitrogen for 60 minutes, cooled and collected. The MFR of the resultant polymer material was 7.9 dg/min.

EXAMPLE 10

A polypropylene homopolymer having an MFR of 0.7 dg/min and I.I. of 95.6% commercially available from Basell USA Inc. was irradiated at 0.5 Mrad under a blanket of nitrogen. The irradiated polymer was then treated with 1.9% by volume of oxygen at 64° C. for 60 minutes and then with 1.9% by volume of oxygen at 130° C. for an additional 60 minutes. The oxygen was then removed. The polymer was then heated at 130° C. under a blanket of nitrogen for 90 minutes, cooled and collected. The MFR of the resultant polymer material was 498 dg/min. The peroxide concentration was 25 mmol/kg of polymer.

Unless otherwise specified, the samples in the Examples were compounded using a ZSK 40 mm twin-screw extruder, commercially available from General Electric Company, at a screw speed of 450 rpm, with a throughput of 79.45 kg/hr. Barrel temperatures were 210, 210, 210, 220, 230, 230 die, ° C.

Control Example 11 and Examples 12 to 19 demonstrate the use of an irradiated, oxidized olefin polymer coupling agent of the invention with fiberglass in a non-irradiated, non-oxidized propylene homopolymer material available from Basell USA Inc., having an MFR of 12.6 and an I.I. of 95%. All samples contained 30 wt % PPG 3793 fiberglass, commercially available from PPG Industries.

The heat deflection properties and melt flow properties for Control Example 11 and Examples 12–19 are set forth in Table II.

TABLE II

| Example | Type of Irradiated, oxidized olefin polymer | Irradiated, oxidized olefin polymer, wt % | HDT (1.82 MPa) ° C. | HDT (0.46 MPa) ° C. | MFR, dg/min |
|---|---|---|---|---|---|
| Control Ex. 11 | None | 0 | 109 | 137 | 15.6 |
| 12 | Polymer of Ex. 1 | 2 | 118 | 146 | 11.2 |
| 13 | Polymer of Ex. 1 | 5 | 116 | 145 | 13.9 |
| 14 | Polymer of Ex. 1 | 10 | 119 | 147 | 18.4 |
| 15 | Polymer of Ex. 1 | 20 | 123 | 149 | 31.5 |
| 16 | Polymer of Ex. 2 | 2 | 117 | 144 | 12.3 |
| 17 | Polymer of Ex. 2 | 5 | 122 | 144 | 16.8 |
| 18 | Polymer of Ex. 2 | 10 | 124 | 148 | 25.2 |
| 19 | Polymer of Ex. 2 | 20 | 127 | 149 | 39.2 |

The tensile properties and flex properties for Control Example 11 and Examples 12–19 are set forth in Table III.

TABLE III

| Example | Type of Irradiated, oxidized olefin polymer | Irradiated, oxidized olefin polymer, wt % | Tensile Strength at yield, MPa | Tensile Young's modulus, MPa | Tensile Strength at break, MPa | Flexural Stress at yield, MPa | Flexural Young's modulus, MPa |
|---|---|---|---|---|---|---|---|
| Control Ex. 11 | None | 0 | 42.6 | 8162 | 41.4 | 61.5 | 5876 |
| 12 | Polymer of Example 1 | 2 | 49.5 | 7949 | 48.6 | 70.9 | 5856 |
| 13 | Polymer of Example 1 | 5 | 49.0 | 7687 | 48.9 | 71.1 | 5768 |

TABLE III-continued

| Example | Type of Irradiated, oxidized olefin polymer | Irradiated, oxidized olefin polymer, wt % | Tensile Strength at yield, MPa | Tensile Young's modulus, MPa | Tensile Strength at break, MPa | Flexural Stress at yield, MPa | Flexural Young's modulus, MPa |
|---|---|---|---|---|---|---|---|
| 14 | Polymer of Example 1 | 10 | | 7452 | 51.9 | 76.9 | 5705 |
| 15 | Polymer of Example 1 | 20 | | 7487 | 56.5 | 82.6 | 5836 |
| 16 | Polymer of Example 2 | 2 | 47.3 | 7701 | 47.0 | 67.3 | 5743 |
| 17 | Polymer of Example 2 | 5 | 51.2 | 8073 | 51.1 | 74.0 | 6001 |
| 18 | Polymer of Example 2 | 10 | 53.5 | 7997 | 53.3 | 76.6 | 6037 |
| 19 | Polymer of Example 2 | 20 | | 7659 | 57.6 | 84.0 | 6033 |

As is evident from the data in Tables II and III, the coupling agents of the present invention enhance the balance of mechanical properties of the compositions in the examples.

Control Example 20 and Examples 21–22 demonstrate the use of an irradiated, oxidized propylene polymer coupling agent of the invention as a concentrate with fiberglass.

The compositions, extrusion conditions and mechanical properties of Control Example 20 and Examples 21–22 are set forth in Table IV.

TABLE IV

| | Examples | | |
|---|---|---|---|
| | Control Example 20 | 21 | 22 |
| Fiberglass, PPG 3793[1], wt % | 30.00 | 30.00 | 30.00 |
| Non-irradiated, non-oxidized propylene homopolymer, wt % MFR = 12.5, I.I = 95.0% | 69.80 | | |
| Irganox B225 antioxidant[2], wt % | 0.13 | 0.13 | 0.13 |
| Irradiated, oxidized polymer of Example 8, wt % | | 69.80 | |
| Irradiated, oxidized polymer of Example 7, wt % | | | 69.80 |
| Calcium stearate, wt % | 0.07 | 0.07 | 0.07 |
| 40 mm ZSK extruder conditions | Barrel Temps: 230° C. flat | | |
| Tensile strength, max., MPa | 44.4 | 63.1 | 63.9 |
| Flex Modulus, 1% secant, MPa | 4219 | 5543 | 5770 |
| Flexural strength, yield, MPa | 65.4 @ 1.9% | 87.5 @ 1.8% | 88.1 @ 1.7% |

TABLE IV-continued

| | Examples | | |
|---|---|---|---|
| | Control Example 20 | 21 | 22 |
| HDT @264 psi, ° C. | 116 | 132 | 139 |
| MFR, dg/min | 6.8 | 421 | 565 |

[1]PPG-3793 fiberglass is commercially available from PPG Industries.
[2]Irganox B225 is a blend of 1 part Irganox-1010 stabilizer and 1 part Irgafos phosphite, commercially available from Ciba Specialty Chemicals Corporation.

As is evident from the data in Table IV, the coupled polymer concentrate of the invention, containing fiberglass, demonstrated an enhanced balance of mechanical properties relative to the control.

Control Examples 23 and 26, and Examples 24–25, and 27 demonstrate the use of an irradiated, oxidized propylene homopolymer and irradiated, oxidized ethylene copolymer coupling agent in compositions containing PPG 3793 fiberglass, commercially available from PPG Industries, and a non-irradiated, non-oxidized low density polyethylene with a density of 0.919 and MFR of 0.9 commercially available from Equistar Chemicals LP, and a non-irradiated, non-oxidized propylene homopolymer commercially available from Basell USA Inc.

The composition of Control Examples 23 and 26 and Examples 24–25, and 27 are set forth in Table V.

TABLE V

| Examples | Control Ex. 23 | 24 | 25 | Control Ex. 26 | 27 |
|---|---|---|---|---|---|
| Fiberglass, PPG 3793, wt % | 29.95 | 29.95 | 29.95 | 29.95 | 29.95 |
| Non-irradiated, non-oxidized propylene homopolymer, wt %; MFR = 12.5, I.I. = 95.0% | | | | 69.88 | 59.90 |
| Non-irradiated, non-oxidized polyethylene[1], wt % MFR = 2.0, I.I. = 85% | 69.88 | 59.90 | 59.90 | | |
| Irradiated, oxidized propylene of Example 10, wt % | | 9.98 | | | |
| Irradiated, oxidized ethylene of Example 9, wt % | | | 9.98 | | 9.98 |

TABLE V-continued

| Examples | Control Ex. 23 | 24 | 25 | Control Ex. 26 | 27 |
|---|---|---|---|---|---|
| Ethanox ® 330[2] antioxidant, wt % | 0.1 | 0.1 | 0.1 | 0.1 | 0.1 |
| Calcium stearate, wt % | 0.07 | 0.07 | 0.07 | 0.07 | 0.07 |
| MFR, dg/min | 1.9 | 4.4 | 1.9 | 8.2 | 5.7 |

[1]NA960-000
[2]Ethanox ® 330 antioxidant is commercially available from Albemarle Corporation.

The heat deflection properties of Control Examples 23 and 26 and Examples 24–25 and 27 are set forth in Table VI.

TABLE VI

| Example | HDT (1.82 MPa) ° C. | HDT (0.46 MPa) ° C. |
|---|---|---|
| Control Ex. 23 | 58 | 99 |
| Example 24 | 79 | 115 |
| Example 25 | 63 | 104 |
| Control Ex. 26 | 117 | 142 |
| Example 27 | 112 | 138 |

The tensile properties and flex properties for Control Example 23 and 26, and Examples 24–25, and 27 are set forth in Table VII.

TABLE VII

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control Ex. 23 | 13.6 | 4067 | 9.1 | 16.8 | 2274 |
| Example 24 | 34.8 | 4845 | 34.4 | 41.7 | 2852 |
| Example 25 | 15.8 | 4320 | 4.6 | 18.4 | 2300 |
| Control Ex. 26 | 41.3 | 8080 | 40.0 | 61.2 | 5695 |
| Example 27 | 40.2 | 7880 | 39.7 | 54.8 | 5461 |

As is evident from the data in Tables VI and VII, the irradiated, oxidized propylene polymer and irradiated, oxidized ethylene polymer coupling agents of the present invention enhance the balance of mechanical properties in the non-irradiated, non-oxidized polyethylene composition containing fiberglass.

Control Example 28 and Examples 29–35 demonstrate the use of an irradiated, oxidized propylene homopolymer coupling agent in compositions containing PPG 3793 fiberglass, commercially available from PPG Industries, R1–04 TiO$_2$, commercially available from E.I. du Pont de Nemours and Company, and a non-irradiated, non-oxidized propylene homopolymer commercially available from Basell USA Inc.

The composition of Control Example 28 and Examples 29–35 are set forth in Table VIII.

TABLE VIII

| Examples | Control Example 28 | 29 | 30 | 31 | 32 | 33 | 34 | 35 |
|---|---|---|---|---|---|---|---|---|
| Fiberglass, PPG 3793, wt % | 29.36 | 29.36 | 28.8 | 28.0 | 24.96 | 25.71 | 26.99 | 29.73 |
| Non-irradiated, non-oxidized propylene homopolymer, wt % MFR = 12.6, I.I. = 95% | 68.51 | 66.56 | 64.3 | 60.65 | 56.39 | 55.71 | 53.97 | 49.54 |
| TiO$_2$, wt % | 1.96 | 1.96 | 1.9 | 1.87 | 1.66 | 1.29 | 0.9 | 0.74 |
| Irradiated, oxidized PP of Example 1, wt % | | 1.96 | 4.8 | 9.33 | 16.64 | 17.14 | 17.99 | 19.82 |
| Ethanox ® 330[1] antioxidant, wt % | 0.1 | 0.1 | 0.1 | 0.09 | 0.08 | 0.09 | 0.09 | 0.10 |
| Calcium stearate, wt % | 0.07 | 0.07 | 0.07 | 0.07 | 0.06 | 0.06 | 0.06 | 0.07 |
| MFR, dg/min | 11 | 13 | 17 | 24 | 31 | 39 | 36 | 31 |

[1]Ethanox ® 330 antioxidant is commercially available from Albemarle Corporation.

The heat deflection properties of Control Example 28 and Examples 29–35 are set forth in Table IX.

TABLE IX

| Example | HDT (1.82 Mpa) ° C. | HDT (0.46 Mpa) ° C. |
|---|---|---|
| Control Ex. 28 | 115 | 142 |
| Example 29 | 120 | 146 |
| Example 30 | 122 | 147 |
| Example 31 | 121 | 147 |
| Example 32 | 124 | 148 |
| Example 33 | 123 | 148 |
| Example 34 | 123 | 147 |
| Example 35 | 122 | 147 |

The tensile properties and flex properties for Control Example 28 and Examples 29–35 are set forth in Table X.

TABLE X

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control Ex. 28 | 39.8 | 7935 | 36.2 | 58.3 | 5939 |
| Example 29 | 42.1 | 7811 | 41.1 | 58.2 | 5865 |
| Example 30 | 43.7 | 8252 | 43.8 | 60.0 | 5725 |
| Example 31 | 45.6 | 8080 | 45.5 | 61.9 | 5717 |
| Example 32 | 47.7 | 7811 | 47.7 | 65.2 | 5708 |
| Example 34 | 49.5 | 7825 | 49.5 | 68.4 | 5686 |
| Example 35 | 49.5 | 7549 | 49.5 | 68.9 | 5636 |
| Example 36 | 48.9 | 7783 | 48.9 | 68.2 | 5647 |

The color dispersion test results for Control Example 28 and Examples 29–35 are set forth in Table XI.

TABLE XI

| Examples | L | a | b | Delta L | Delta a | Delta b |
|---|---|---|---|---|---|---|
| Control Ex. 28 | 89.17 | −0.44 | 2.97 | | | |
| 29 | 92.80 | −0.94 | 3.80 | 3.63 | −0.50 | 0.83 |
| 30 | 93.38 | −1.09 | 3.74 | 4.21 | −0.65 | 0.77 |
| 31 | 92.93 | −0.98 | 3.76 | 3.76 | −0.54 | 0.79 |
| 32 | 93.74 | −1.08 | 3.77 | 4.57 | −0.64 | 0.80 |
| 33 | 92.47 | −1.21 | 4.01 | 3.30 | −0.77 | 1.04 |
| 34 | 92.02 | −1.49 | 4.92 | 2.85 | −1.05 | 1.95 |
| 35 | 90.89 | −1.53 | 5.02 | 1.72 | −1.09 | 2.05 |

The composition of Examples 36–39 are set forth in Table XII.

TABLE XII

| | Examples | | | |
|---|---|---|---|---|
| | 36 | 37 | 38 | 39 |
| Fiberglass, PPG 3793, wt % | 29.36 | 29.36 | 29.36 | 29.36 |
| Non-irradiated, non-oxidized propylene homopolymer, wt % MFR = 12.6, I.I. = 95% | 66.56 | 63.62 | 58.73 | 48.94 |
| TiO$_2$, wt % | 1.96 | 1.96 | 1.96 | 1.96 |
| Irradiated, oxidized propylene heterophasic polymer of Ex. 3, wt % | 1.96 | 4.89 | 9.79 | 19.58 |
| Ethanox ® 330[1] antioxidant, wt % | 0.1 | 0.1 | 0.1 | 0.1 |
| Calcium stearate, wt % | 0.07 | 0.07 | 0.07 | 0.07 |
| MFR, dg/min | 12 | 14 | 17 | 19 |

[1]Ethanox ® 330 antioxidant is commercially available from Albemarle Corporation.

The heat deflection properties for Control Example 28 and Examples 36–39 are set forth in Table XIII.

TABLE XIII

| Example | HDT (1.82 MPa) ° C. | HDT (0.46 MPa) ° C. |
|---|---|---|
| Control Example 28 | 115 | 142 |
| Example 36 | 119 | 146 |
| Example 37 | 122 | 148 |
| Example 38 | 123 | 148 |
| Example 39 | 122 | 148 |

The tensile properties and flex properties of Control Example 28 and Examples 36–39 are set forth in Table XIV.

TABLE XIV

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control Example 28 | 39.8 | 7866 | 36.2 | 58.2 | 5939 |
| Example 36 | 41.5 | 8452 | 39.5 | 58.7 | 5992 |
| Example 37 | 41.7 | 8314 | 40.5 | 57.8 | 5869 |
| Example 38 | 41.6 | 7852 | 40.5 | 56.8 | 5777 |
| Example 39 | 41.1 | 8011 | 41.1 | 55.5 | 5665 |

Increasing color strength of the TiO$_2$ white color is indicated by a higher positive value of the delta L value. As is evident from the data in Tables IX to XI, the irradiated, oxidized olefin polymer coupling agent of the invention enhances a balance of mechanical properties, as well as providing improved dispersion of the TiO$_2$.

Examples 36–39 demonstrate the use of an irradiated, oxidized propylene heterophasic polymer coupling agent in compositions containing PPG 3793 fiberglass, commercially available from PPG Industries, R1–04 TiO$_2$, commercially available from E.I. du Pont de Nemours and Company, and a non-irradiated, non-oxidized propylene homopolymer commercially available from Basell USA Inc.

The color dispersion test results for Control Example 28 and Examples 36–39 are set forth in Table XV.

TABLE XV

| Examples | L | a | b | Delta L | Delta a | Delta b |
|---|---|---|---|---|---|---|
| Control Ex. 28 | 89.17 | −0.44 | 2.97 | | | |
| 36 | 93.06 | −0.91 | 3.68 | 4.43 | −0.47 | 0.71 |
| 37 | 92.81 | −0.95 | 3.93 | 3.64 | −0.51 | 0.96 |
| 38 | 92.26 | −0.82 | 4.15 | 3.09 | −0.38 | 1.18 |
| 39 | 92.90 | −0.94 | 3.85 | 3.73 | −0.50 | 0.88 |

Increasing color strength of the TiO$_2$ white color is indicated in a higher positive value of the delta L value. As is evident from the data in Tables XIII to XV, the irradiated, oxidized olefin polymer coupling agent of the invention enhances both a balance of mechanical properties, as well as improving dispersion of the $TiO_2$.

Examples 40–43 demonstrate the use of an irradiated, oxidized propylene-ethylene random copolymer coupling agent in compositions containing PPG 3793 fiberglass, commercially available from PPG Industries, R1-04 $TiO_2$, commercially available from E.I. du Pont de Nemours and Company, and a non-irradiated, non-oxidized propylene homopolymer commercially available from Basell USA Inc.

The composition of Examples 40–43 are set forth in Table XVI.

TABLE XVI

|  | Examples | | | |
|---|---|---|---|---|
|  | 40 | 41 | 42 | 43 |
| Fiberglass, PPG 3793, wt % | 29.36 | 29.36 | 29.36 | 29.36 |
| Non-irradiated, non-oxidized propylene homopolymer, wt % MFR = 12.6, I.I. = 95% | 66.56 | 63.62 | 58.73 | 48.94 |
| $TiO_2$, wt % | 1.96 | 1.96 | 1.96 | 1.96 |
| Irradiated, oxidized random copolymer of Ex. 4, wt % | 1.96 | 4.89 | 9.79 | 19.58 |
| Ethanox ® 330[1] antioxidant, wt % | 0.1 | 0.1 | 0.1 | 0.1 |
| Calcium stearate, wt % | 0.07 | 0.07 | 0.07 | 0.07 |
| MFR, dg/min | 15 | 18 | 23 | 35 |

[1]Ethanox ® 330 antioxidant is commercially available from Albemarle Corporation.

The heat deflection properties of Control Example 28 and Examples 40–43 are set forth in Table XVII.

TABLE XVII

| Example | HDT (1.82 MPa) ° C. | HDT (0.46 MPa) ° C. |
|---|---|---|
| Control Example 28 | 115 | 142 |
| Example 40 | 121 | 146 |
| Example 41 | 122 | 147 |
| Example 42 | 121 | 146 |
| Example 43 | 120 | 143 |

The tensile properties and flex properties of Control Example 28 and Examples 40–43 are set forth in XVIII.

TABLE XVIII

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control Example 28 | 39.8 | 7866 | 36.2 | 58.2 | 5939 |
| Example 40 | 41.3 | 7935 | 39.1 | 57.5 | 5799 |
| Example 41 | 42.1 | 8004 | 41.7 | 58.2 | 5796 |
| Example 42 | 42.9 | 8183 | 42.7 | 58.7 | 5814 |
| Example 43 | 43.8 | 7521 | 43.8 | 59.6 | 5632 |

The color dispersion results for Control Example 28 and Examples 40–43 are set forth in Table XIX.

TABLE XIX

| Examples | L | a | b | Delta L | Delta a | Delta b |
|---|---|---|---|---|---|---|
| Comparative Ex. 28 | 89.17 | -0.44 | 2.97 | | | |

TABLE XIX-continued

| Examples | L | a | b | Delta L | Delta a | Delta b |
|---|---|---|---|---|---|---|
| 40 | 92.11 | -0.78 | 4.14 | 2.94 | -0.34 | 1.17 |
| 41 | 93.39 | -1.03 | 3.75 | 4.22 | -0.59 | 0.78 |
| 42 | 92.71 | -0.85 | 4.03 | 3.54 | -0.41 | 1.06 |
| 43 | 93.40 | -1.04 | 3.82 | 4.23 | -0.60 | 0.85 |

Increasing color strength of the $TiO_2$ white color is indicated in a higher positive value of the delta L value. As is evident from the data in Tables XVII to XIX, the irradiated, oxidized olefin polymer coupling agent of the invention enhances both a balance of mechanical properties, as well as improving dispersion of the $TiO_2$.

Control Example 44 and Examples 45–48 demonstrate the use of an irradiated, oxidized propylene homopolymer coupling agent in compositions containing Benwood 2213 talc commercially available from IMI Fabi, LLC and a non-irradiated, non-oxidized propylene homopolymer commercially available from Basell USA Inc.

The composition of Control Example 44 and Examples 45–48 are set forth in Table XX.

TABLE XX

| Examples | Control Ex. 44 | 45 | 46 | 47 | 48 |
|---|---|---|---|---|---|
| Benwood 2213 Talc, wt % | 29.95 | 29.95 | 29.95 | 29.95 | 29.95 |
| Non-irradiated, non-oxidized propylene homopolymer, wt % MFR = 12.6, I.I. = 95% | 69.88 | 67.88 | 64.89 | 59.90 | 49.92 |
| Irradiated, oxidized propylene of Example 1, wt % | | 2.00 | 4.99 | 9.98 | 19.97 |
| Ethanox ® 330[1] antioxidant, wt % | 0.1 | 0.1 | 0.1 | 0.1 | 0.1 |
| Calcium stearate, wt % | 0.07 | 0.07 | 0.07 | 0.07 | 0.07 |
| MFR, dg/min | 10 | 17 | 17 | 25 | 43 |

[1]Ethanox ® 330 antioxidant is commercially available from Albemarle Corporation.

The heat deflection properties of Control Example 44 and Examples 45–48 are set forth in Table XXI.

TABLE XXI

| Example | HDT (1.82 MPa) ° C. | HDT (0.46 MPa) ° C. |
|---|---|---|
| Control Example 44 | 74 | 132 |
| Example 45 | 79 | 136 |
| Example 46 | 76 | 132 |

TABLE XXI-continued

| Example | HDT (1.82 MPa) ° C. | HDT (0.46 MPa) ° C. |
|---|---|---|
| Example 47 | 76 | 131 |
| Example 48 | 73 | 129 |

The tensile properties and flex properties of Control Example 44 and Examples 45–48 are set forth in Table XXII.

TABLE XXII

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control Example 44 | 33.7 | 4276 | 29.1 | 53.8 | 3058 |
| Example 45 | 34.1 | 4332 | 30.0 | 55.0 | 3145 |
| Example 46 | 33.2 | 4296 | 29.3 | 54.0 | 3098 |
| Example 47 | 33.1 | 4172 | 29.8 | 53.7 | 3067 |
| Example 48 | 31.7 | 3988 | 29.5 | 53.5 | 2993 |

As is evident from the data of Tables XXI and XXII, at low concentrations the irradiated, oxidized olefin polymer coupling agents of the invention enhance a balance of mechanical properties in the examples.

Examples 49–55 demonstrate the use of an irradiated, oxidized propylene heterophasic copolymer or an irradiated, oxidized propylene random copolymer coupling agent in compositions containing Benwood 2213 talc commercially available from IMI Fabi, LLC and a non-irradiated, non-oxidized propylene homopolymer commercially available from Basell USA Inc.

The composition of Examples 49–56 are set forth in Table XXIII.

TABLE XXIII

| Examples | 49 | 50 | 51 | 52 | 53 | 54 | 55 | 56 |
|---|---|---|---|---|---|---|---|---|
| Benwood 2213 Talc, wt % | 29.95 | 29.95 | 29.95 | 9.95 | 29.95 | 29.95 | 29.95 | 29.95 |
| Non-irradiated, non-oxidized propylene homopolymer, wt %; MFR = 12.6, I.I. = 95% | 67.88 | 64.89 | 59.90 | 49.92 | 67.88 | 64.89 | 59.90 | 49.92 |
| Irradiated, oxidized propylene heterophasic polymer of Example 3, wt % | 2.00 | 4.99 | 9.98 | 19.97 | | | | |
| Irradiated, oxidized propylene random copolymer of Example 4, wt % | | | | | 2.00 | 4.99 | 9.98 | 19.97 |
| Ethanox ® 330[1] antioxidant, wt % | 0.1 | 0.1 | 0.1 | 0.1 | 0.1 | 0.1 | 0.1 | 0.1 |
| Calcium stearate, wt % | 0.07 | 0.07 | 0.07 | 0.07 | 0.07 | 0.07 | 0.07 | 0.07 |
| MFR, dg/min | 11 | 11 | 13 | 16 | 13 | 16 | 19 | 32 |

[1]Ethanox ® 330 antioxidant is commercially available from Albemarle Corporation.

The heat deflection properties of Control Example 44 and Examples 49–56 are set forth in Table XXIV.

TABLE XXIV

| Example | HDT (1.82 MPa) ° C. | HDT (0.46 MPa) ° C. |
|---|---|---|
| Control Example 44 | 74 | 132 |
| Example 49 | 77 | 132 |
| Example 50 | 78 | 132 |
| Example 51 | 76 | 132 |
| Example 52 | 72 | 128 |
| Example 53 | 75 | 130 |
| Example 54 | 73 | 129 |
| Example 55 | 77 | 130 |
| Example 56 | 74 | 126 |

The tensile properties and flex properties of Control Example 44 and Examples 49–56 are set forth in Table XXV.

TABLE XXV

| Example | Tensile Stress at yield, MPa | Tensile Young's Modulus, MPa | Tensile Strength at Break, MPa | Flexural Stress at yield, MPa | Flexural Young's Modulus, MPa |
|---|---|---|---|---|---|
| Control example 44 | 33.7 | 4276 | 29.1 | 53.8 | 3058 |
| Example 49 | 33.7 | 4235 | 29.5 | 53.7 | 3046 |
| Example 50 | 33.4 | 4190 | 29.8 | 53.2 | 3859 |
| Example 51 | 32.7 | 4056 | 30.2 | 51.9 | 2921 |
| Example 52 | 30.8 | 3834 | 28.4 | 49.2 | 2785 |
| Example 53 | 33.2 | 4175 | 29.0 | 53.1 | 3030 |
| Example 54 | 32.0 | 3791 | 29.0 | 50.7 | 2762 |
| Example 55 | 33.1 | 4087 | 29.1 | 53.1 | 3004 |
| Example 56 | 33.5 | 4004 | 29.6 | 53.2 | 2981 |

Compositions were prepared using a non-halogenated flame retardant, the irradiated oxidized olefin polymer coupling agents of the invention, and a non-irradiated, non-oxidized propylene homopolymer commercially available from Basell USA Inc. Irganox B225 antioxidant, a blend of 1 part Irganox-1010 stabilizer and 1 part Irgafos phosphite, commercially available from Ciba Chemical Specialties Company, was used as a stabilizer, and calcium stearate was used as an acid scavenger.

All ingredients were dry-blended and compounded in a co-rotating intermeshing Leistritz LSM 34 GL twin-screw extruder, commercially available from American Leistritz Extruder Corp., USA. Extrusion temperatures were at 230° C. for all zones, with a throughput of 11.34 kg/hr., and screw speed of 250 rpm. All materials were injection-molded on a Battenfeld injection-molding machine into flex bars with dimensions of 127 mm±5 mm, by 13 mm±0.5 mm, by 3.13 mm±0.05 mm. Flammability tests were conducted on the injection-molded material using Underwriters Laboratories Inc. UL-94 procedure for vertical test burning.

The composition, mechanical properties and morphology of Control Example 57 and Example 58 are set forth in Table XXVI.

TABLE XXVI

| Examples | Control Ex. 57 | 58 |
|---|---|---|
| Non-irradiated, non-oxidized propylene homopolymer, wt % MFR = 4.6, I.I = 95.0% | 39.9 | |
| Flame Retardant Z50SA[1], wt % | 59.8 | 59.8 |
| Irradiated, oxidized polymer of Example 6, wt % | | 39.9 |
| Irganox B225 antioxidant, wt % | 0.2 | 0.2 |
| Calcium stearate, wt % | 0.1 | 0.1 |
| Tensile @ yield, Mpa | 24.1 | 24.4 |
| Tensile @ break, Mpa | 21.0 | 21.0 |
| Flex Modulus, Mpa | 3243 | 3324 |
| Flex Strength, Mpa | 40.3 | 41.0 |
| Morphology | Dull | Glossy |
| MFR, dg/min @ 3.8 kg; 230° C. | 1.8 | 1.1 |

[1]Z50SA magnesium hydroxide is a flame retardant commercially available from J. M. Huber Corporation.

As shown by the data in Table XXVI, the irradiated, oxidized olefin polymer coupling agent of the invention enhances both a balance of mechanical properties and morphology of the example.

The composition, mechanical properties, morphology and flammability results of Control Example 59 and Examples 60–61 are set forth in Table XXVII.

TABLE XXVII

| Examples | Control Example 59 | 60 | 61 |
|---|---|---|---|
| Non-irradiated, non-oxidized propylene homopolymer, wt % MFR = 12.66, I.I = 95.0% | 27.9 | 17.9 | 10 |
| Flame Retardant Z50SA[1], wt % | 71.8 | 71.8 | 79.7 |
| Irradiated, oxidized propylene of Example 5, wt % | 0 | 10 | 10 |
| Irganox B225 antioxidant, wt % | 0.2 | 0.2 | 0.2 |
| Calcium stearate, wt % | 0.1 | 0.1 | 0.1 |
| Tensile @ yield (MPa) | 27.6 | 32.2 | 32.7 |
| Tensile @ break (MPa) | 27.6 | 32.2 | 32.7 |
| Flex Modulus (Mpa) | 3834 | 4041 | 4490 |
| Flex Strength (MPa) | 37.7 | 46.5 | 45.2 |
| Morphology | Dull | Gloss | Gloss |
| Flammability | V-0 | V-0 | V-0 |

[1]Z50SA magnesium hydroxide is a flame retardant commercially available from J. M. Huber Corporation.

As shown by the data in Table XXVII, the irradiated, oxidized olefin polymer coupling agent of the invention enhances both a balance of mechanical properties and morphology of the examples.

The composition, mechanical properties, morphology and flammability results of Control Examples 62–64 and Examples 65–67 are set forth in Table XXVIII.

TABLE XXVIII

| Example | Control Ex. 62 | Control Ex. 63 | Control Ex. 64 | 65 | 66 | 67 |
|---|---|---|---|---|---|---|
| Non-irradiated, non-oxidized propylene homopolymer, wt % MFR = 12.66, I.I. = 95% | 27.9 | 17.9 | 31.9 | 21.9 | 17.9 | 8.0 |
| Flame Retardant Z50SP[1], wt % | 71.8 | 71.8 | 67.8 | 67.8 | 71.8 | 71.8 |
| Non-irradiated, non-oxidized propylene homopolymer, wt % MFR = 440, I.I. = 97.5 | | 10.0 | | | | |
| Irradiated, oxidized propylene of Ex. 5, wt % | | | | 10.0 | 10.0 | 19.9 |
| Irganox B225 antioxidant, wt % | 0.2 | 0.2 | 0.2 | 0.2 | 0.2 | 0.2 |
| Calcium stearate, wt % | 0.1 | 0.1 | 0.1 | 0.1 | 0.1 | 0.1 |
| Tensile @ yield (MPa) | 24.5 | 24.5 | 25.0 | 27.7 | 28.3 | 27.5 |
| Tensile @ break (MPa) | 24.5 | 24.5 | 25.0 | 27.7 | 28.3 | 27.5 |
| Flex Modulus (Mpa) | 3303 | | 3082 | 3200 | 3510 | 3561 |
| Flex Strength (MPa) | 32.8 | 31.6 | 32.8 | 34.4 | 36.4 | 36.0 |
| Morphology | Dull | Dull | | | Glossy | Glossy |
| Flammability | V-0 | V-0 | V-0 | V-0 | V-0 | V-0 |
| MFR, dg/min | 3.7 | 2.1 | 5.6 | 5.8 | 9 | 28 |

[1]Z50SP magnesium hydroxide is a flame retardant commercially available from J. M. Huber Corporation.

As shown by the data in Table XXVIII, the irradiated, oxidized olefin polymer coupling agent of the invention enhances both a balance of mechanical properties and morphology of the examples.

The composition, mechanical properties and morphology of Control Examples 68 and 71, and Examples 69–70 and 72–73 are set forth in Table XXIX.

TABLE XXIX

| Examples | Control Ex. 68 | 69 | 70 | Control Ex. 71 | 72 | 73 |
|---|---|---|---|---|---|---|
| Non-irradiated, non-oxidized propylene homopolymer, wt % MFR = 0.4, I.I. = 95.4% | 39.9 | 29.9 | 19.9 | 49.8 | 39.9 | 29.9 |
| Flame Retardant Vertex[1], wt % | 59.8 | 59.8 | 59.8 | 49.9 | 49.9 | 49.8 |
| Irradiated, oxidized polymer of Ex. 5, wt % | 0 | 10 | 20 | 0 | 10 | 20 |
| Irganox B225 antioxidant, wt % | 0.2 | 0.2 | 0.2 | 0.2 | 0.2 | 0.2 |
| Calcium stearate, wt % | 0.1 | 0.1 | 0.1 | 0.1 | 0.1 | 0.1 |
| Tensile @ yield (MPa) | 22.8 | 24.4 | 25.5 | 24.0 | 25.3 | 25.9 |
| Tensile @ break (MPa) | 16.4 | 18.8 | 20.2 | 16.7 | 18.8 | 18.4 |
| Flex Modulus (MPa) | 2593 | 2655 | 2572 | 2207 | 2448 | 2386 |
| Flex Strength (MPa) | 42.8 | 42.9 | 42.9 | 44.2 | 45.4 | 44.9 |
| Morphology | Dull | Dull | Glossy | Dull | Dull | Glossy |

[1]Vertex magnesium hydroxide flame retardant is commercially available from J. M. Huber Corporation.

As shown by the data in Table XXIX, the irradiated, oxidized olefin polymer coupling agent of the invention enhanced a balance of mechanical properties, and the morphology of the samples at concentrations above 10%.

The composition, mechanical properties and morphology results of Control Examples 74 and 77, and Examples 75–76 and 78–79 are set forth in Table XXX.

TABLE XXX

| Examples | Control Ex. 74 | 75 | 76 | Control Ex. 77 | 78 | 79 |
|---|---|---|---|---|---|---|
| Non-irradiated, non-oxidized propylene homopolymer, wt % MFR = 0.4, I.I. = 95.4% | 39.9 | 29.9 | 19.9 | 49.8 | 39.9 | 29.9 |
| Flame Retardant Vertex[1], wt % | 59.8 | 59.8 | 59.8 | 49.8 | 49.8 | 49.8 |
| Irradiated, oxidized propylene heterophasic polymer of Example 3, wt % | 0 | 10 | 20 | 0 | 10 | 20 |
| Irganox B225 antioxidant, wt % | 0.2 | 0.2 | 0.2 | 0.2 | 0.2 | 0.2 |
| Calcium stearate, wt % | 0.1 | 0.1 | 0.1 | 0.1 | 0.1 | 0.1 |
| Tensile @ yield (MPa) | 22.8 | 15.8 | 23.6 | 24.0 | 24.8 | 24.4 |
| Tensile @ break (MPa) | 16.4 | 17.9 | 18.4 | 16.7 | 18.3 | 17.9 |
| Flex Modulus (MPa) | 2593 | 2745 | 2428 | 2207 | 2407 | 2193 |
| Flex Strength (MPa) | 42.8 | 43.1 | 42.5 | 44.2 | 45.2 | 44.4 |
| Morphology | Dull | Dull | Gloss | Dull | Dull | Glossy |

[1]Vertex magnesium hydroxide flame retardant is commercially available from J. M. Huber Corporation.

As shown by the data in Table XXX, the irradiated, oxidized olefin polymer coupling agent of the invention enhanced a balance of mechanical properties, and improves the morphology of the examples at concentrations above 10 wt %.

The composition and mechanical properties of Control Examples 80 and 82, and Example 81 are set forth in Table XXXI.

TABLE XXXI

| Examples | Control Ex. 80 | 81 | Control Ex. 82 |
|---|---|---|---|
| Non-irradiated, non-oxidized propylene homopolymer, wt % MFR = 12.66, I.I. = 95% | 39.9 | 29.9 | 29.9 |
| Flame Retardant Vertex[1], wt % | 59.8 | 59.8 | 59.8 |
| Irradiated, oxidized polymer of Ex. 5, wt % | | 10 | |
| Non-irradiated, non-oxidized propylene homopolymer, wt %; MFR = 400, I.I. = 97.5% | | | 10 |
| Irganox B225 antioxidant, wt % | 0.2 | 0.2 | 0.2 |
| Calcium stearate, wt % | 0.1 | 0.1 | 0.1 |
| Tensile @ yield (MPa) | 22.8 | 24.8 | 23.2 |
| Tensile @ break (MPa) | 20.8 | 24.0 | 21.0 |
| Flex Modulus (MPa) | 2807 | 2455 | 2876 |
| Flex Strength (MPa) | 37.0 | 39.3 | 36.9 |
| MFR, dg/min | 12 | 30 | 20 |

[1]Vertex magnesium hydroxide flame retardant is commercially available from J. M. Huber Corporation.

As shown by the data in Table XXXI, the irradiated, oxidized olefin polymer coupling agent of the invention enhances a balance of mechanical properties in the examples.

Compositions were prepared using Tremin VP939 wollastonite, commercially available from Quarzwerke GmbH, a non-irradiated, non-oxidized propylene homopolymer commercially available from Basell USA Inc., and the irradiated, oxidized olefin polymer coupling agents of the invention. Irganox B225 antioxidant, a blend of 1 part Irganox-1010 stabilizer and 1 part Irgafos phosphite, commercially available from Ciba Chemical Specialties Company, was used as a processing stabilizer, and calcium stearate was used as an acid scavenger. The samples were compounded using a 40 mm ZSK extruder commercially available from General Electric Company, at a screw speed of 450 rpm, and barrel temperatures of 230 Deg C. flat.

Composition and mechanical properties for Control Example 83 and Example 84 are set forth in Table XXXII.

TABLE XXXII

| Examples | Control Example 83 | 84 |
|---|---|---|
| Tremin VP939 wollastonite, wt % | 30.00 | 30.00 |
| Non-irradiated, non-oxidized propylene homopolymer, wt % MFR = 12.5, I.I = 95.0% | 69.80 | |
| Irganox B225 antioxidant, wt % | 0.13 | 0.13 |
| Irradiated, oxidized polymer of Example 7, wt % | | 69.80 |
| Calcium stearate, wt % | 0.07 | 0.07 |
| 40 mm ZSK extruder throughput, kg/hr | 79.45 | 99.88 |
| Tensile strength, max., MPa | 34.5 | 29.1 |
| Flex Modulus, 1% secant, MPa | 2771 | 3362 |
| Flexural strength, yield, MPa | 52.9 | 45.2 @ 2.0% |
| HDT @ 264 psi, °C. | 79 | 91 |
| MFR, dg/min | 12.1 | 682 |

As shown in the data in Table XXXII, the irradiated, oxidized olefin polymer coupling agent of the invention improves the flexural modulus, heat deflection and melt flow of the example.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A non-halogenated flame retardant-containing or filler-containing olefin polymer composition comprising:
   A. 2.0 to 60.0 wt % of an irradiated, oxidized, olefin polymer material;
   B. 10.0 to 85.0 wt % of (i) a non-halogenated flame retardant, (ii) a filler selected from the group consisting of fiberglass, carbon fibers, graphite fibers, whiskers, metal fibers, aramides, talc, wollastonite, calcium carbonate, mica, glass microspheres, glass wool, rock wool, stainless steel wool, steel wool, gypsum, alumina, alumina-silica, and silica, or (iii) mixtures thereof; and
   C. 1.0 to 88.0 wt % of a non-irradiated, non-oxidized olefin polymer material;
   wherein the sum of components A+B+C is equal to 100 wt %.

2. The composition of claim 1 wherein component A and component C are selected from the group consisting of:
   (a) a crystalline homopolymer of propylene having an isotactic index greater than 80%;
   (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight;
   (c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and when ethylene is one of the olefins, the maximum polymerized ethylene content is 5% by weight;
   (d) an olefin polymer composition comprising:
      (i) 10 parts to 60 parts by weight of a crystalline propylene homopolymer having an isotactic index at least 80%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, and an isotactic index greater than 60%;
      (ii) 3 parts to 25 parts by weight of a copolymer of ethylene and propylene or a $C_4$–$C_8$ α-olefin that is insoluble in xylene at ambient temperature; and
      (iii) 10 parts to 80 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing 0.5% to 10% by weight of a diene, and containing less than 70% by weight, and being soluble in xylene at ambient temperature and having an intrinsic viscosity of 1.5 to 4.0 dl/g;
   the total of (ii) and (iii), based on the total olefin polymer composition being from 50% to 90%, and the weight ratio of (ii)/(iii) being less than 0.4, wherein the composition is prepared by polymerization in at least two stages;
   (e) a thermoplastic olefin comprising:
      (i) 10% to 60% of a propylene homopolymer having an isotactic index at least 80%, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;
      (ii) 20% to 60% of an amorphous copolymer selected from the group consisting of (a) ethylene and propylene, (b) ethylene, propylene, and a $C_4$–$C_8$ α-olefin, and (c) ethylene and a α-olefin, the copolymer optionally containing 0.5% to 10% of a diene, and containing less than 70% ethylene and being soluble in xylene at ambient temperature; and
      (iii) 3% to 40% of a copolymer of ethylene and propylene or an α-olefin that is insoluble in xylene at ambient temperature;
   (f) homopolymers of ethylene;
   (g) random copolymers of ethylene and an alpha-olefin selected from the group consisting of $C_{3-10}$ alpha-olefins having a maximum polymerized alpha-olefin content of 20 wt %;
   (h) random terpolymers of ethylene and $C_{3-10}$ alpha-olefins having a maximum polymerized alpha-olefin content of 20 wt %;

(i) homopolymers of butene-1;

(j) copolymers or terpolymers of butene-1 with a non-butene alpha-olefin comonomer content from 1 to 15 mole %; and (k) mixtures thereof.

3. The composition of claim 2 wherein the non-irradiated, non-oxidized olefin polymer is a crystalline homopolymer of propylene having an isotactic index greater than 80%.

4. The composition of claim 2 wherein the irradiated, oxidized olefin polymer starting material is a crystalline homopolymer of propylene having an isotactic index greater than 80%.

5. The composition of claim 2 wherein the irradiated, oxidized olefin polymer is produced by a process comprising:

a. irradiating a non-irradiated, non-oxidized olefin polymer starting material under a blanket of an inert gas, thereby producing an irradiated olefin polymer material;

b. adding a controlled amount of oxygen to expose the irradiated olefin polymer material to a first active oxygen concentration greater than 0.004% but less than 15% by volume, at a first temperature of from 25° C. to a temperature below the softening point of the irradiated olefin polymer material; and c. heating the irradiated, oxidized olefin polymer material of step (b) to a second temperature of from at least 25° C. to a temperature below the softening point of the irradiated, oxidized olefin polymer material of step (b), while adding a controlled amount of oxygen to expose the irradiated, oxidized olefin polymer material of step (b) to a second controlled active oxygen concentration greater than 0.004%, but less than 15% by volume.

6. The composition of claim 1 wherein component B is the non-halogenated flame retardant selected from the group consisting of quaternary phosphonium compounds, magnesium hydroxide, aluminum hydroxide or its hydrates and mixtures thereof.

7. The composition of claim 1 wherein component B is fiberglass present in an amount from 10 to 50 wt %.

8. The composition of claim 1 wherein the filler is talc present in an amount from 10 to 50 wt %.

9. The composition of claim 1 further comprising an additive selected from the group consisting of colorants, halogenated flame retardants, conductive carbon black, anti-microbial agents, anti-acids and mixtures thereof, present in an amount from 0.1 to 5.0 wt %.

10. A coupling agent-containing olefin polymer concentrate comprising:

A. 10.0 to 85.0 wt % of (i) a non-halogenated flame retardant, (ii) a filler selected from the group consisting of fiberglass, carbon fibers, graphite fibers, metal fibers, whiskers, aramides, talc, wollastonite, calcium carbonate, mica, glass microspheres, glass wool, rock wool, stainless steel wool, steel wool, gypsum, alumina, alumina-silica, and silica, or (iii) mixtures thereof; and B. 90.0 to 15.0 wt % of an irradiated, oxidized, olefin polymer material;

wherein the sum of components A+B is equal to 100 wt %.

11. The composition of claim 10 wherein the irradiated, oxidized olefin polymer starting material is produced from a non-irradiated, non-oxidized olefin polymer starting material comprising:

(a) a crystalline homopolymer of propylene having an isotactic index greater than 80%;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight;

(d) an olefin polymer composition comprising:

(i) 10 parts to 60 parts by weight of a crystalline propylene homopolymer having an isotactic index at least 80%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, and an isotactic index greater than 60%;

(ii) 3 parts to 25 parts by weight of a copolymer of ethylene and propylene or a $C_4$–$C_8$ α-olefin that is insoluble in xylene at ambient temperature; and (iii) 10 parts to 80 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing 0.5% to 10% by weight of a diene, and containing less than 70% by weight, and being soluble in xylene at ambient temperature and having an intrinsic viscosity of 1.5 to 4.0 dl/g;

the total of (ii) and (iii), based on the total olefin polymer composition being from 50% to 90%, and the weight ratio of (ii)/(iii) being less than 0.4, wherein the composition is prepared by polymerization in at least two stages; and (e) a thermoplastic olefin comprising:

(i) 10% to 60% of a propylene homopolymer having an isotactic index at least 80%, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;

(ii) 20% to 60% of an amorphous copolymer selected from the group consisting of (a) ethylene and propylene, (b) ethylene, propylene, and a $C_4$–$C_8$ α-olefin, and (c) ethylene and an α-olefin, the copolymer optionally containing about 0.5% to about 10% of a diene, and containing less than 70% ethylene and being soluble in xylene at ambient temperature; and (iii) about 3% to about 40% of a copolymer of ethylene and propylene or an α-olefin that is insoluble in xylene at ambient temperature (f) homopolymers of ethylene;

(g) random copolymers of ethylene and an alpha-olefin selected from the group consisting of $C_{3-10}$ alpha olefins having a maximum polymerized alpha-olefin content of 20 wt %;

(h) random terpolymers of ethylene and $C_{3-10}$ alpha olefins having a maximum polymerized alpha-olefin content of 20 wt %;

(i) homopolymers of butene-1;

(j) copolymers or terpolymers of butene-1 with a non-butene alpha-olefin comonomer content from 1 to 15 mole %; and (k) mixtures thereof.

12. The composition of claim 11, wherein the olefin polymer starting material is a crystalline homopolymer of polypropylene having an isotactic index of greater than 80%.

13. The composition of claim 11, wherein the irradiated, oxidized olefin polymer is produced by a process comprising:

a. irradiating the non-irradiated, non-oxidized olefin polymer starting material under a blanket of an inert gas, thereby producing an irradiated olefin polymer material;

b. adding a controlled amount of oxygen to expose the irradiated olefin polymer material to a first active oxygen concentration greater than 0.004% but less than 15% by volume, at a first temperature of from 25° C. to a temperature below the softening point of the irradiated olefin polymer material; and c. heating the irradiated, oxidized olefin polymer material of step (b) to a second temperature of from at least 25° C. to a temperature below the softening point of the irradiated, oxidized olefin polymer material of step (b), while adding a controlled amount of oxygen to expose the irradiated, oxidized olefin polymer material of step (b) to a second active oxygen concentration greater than 0.004%, but less than 15% by volume.

14. The composition of claim 10 wherein component B is the non-halogenated flame retardant.

15. The composition of claim 10 wherein component B is fiberglass present in an amount from 10 to 70 wt %.

16. The composition of claim 11 wherein the filler is talc present in an amount from 10 to 70 wt %.

* * * * *